Sept. 22, 1970  C. F. DE MEY II  3,529,889
OPTICAL FILTER CHANGING MECHANISM
Filed Feb. 12, 1968  2 Sheets-Sheet 1

INVENTOR.
Charles F. deMey II
BY
Daniel R. Levinson
ATTORNEY.

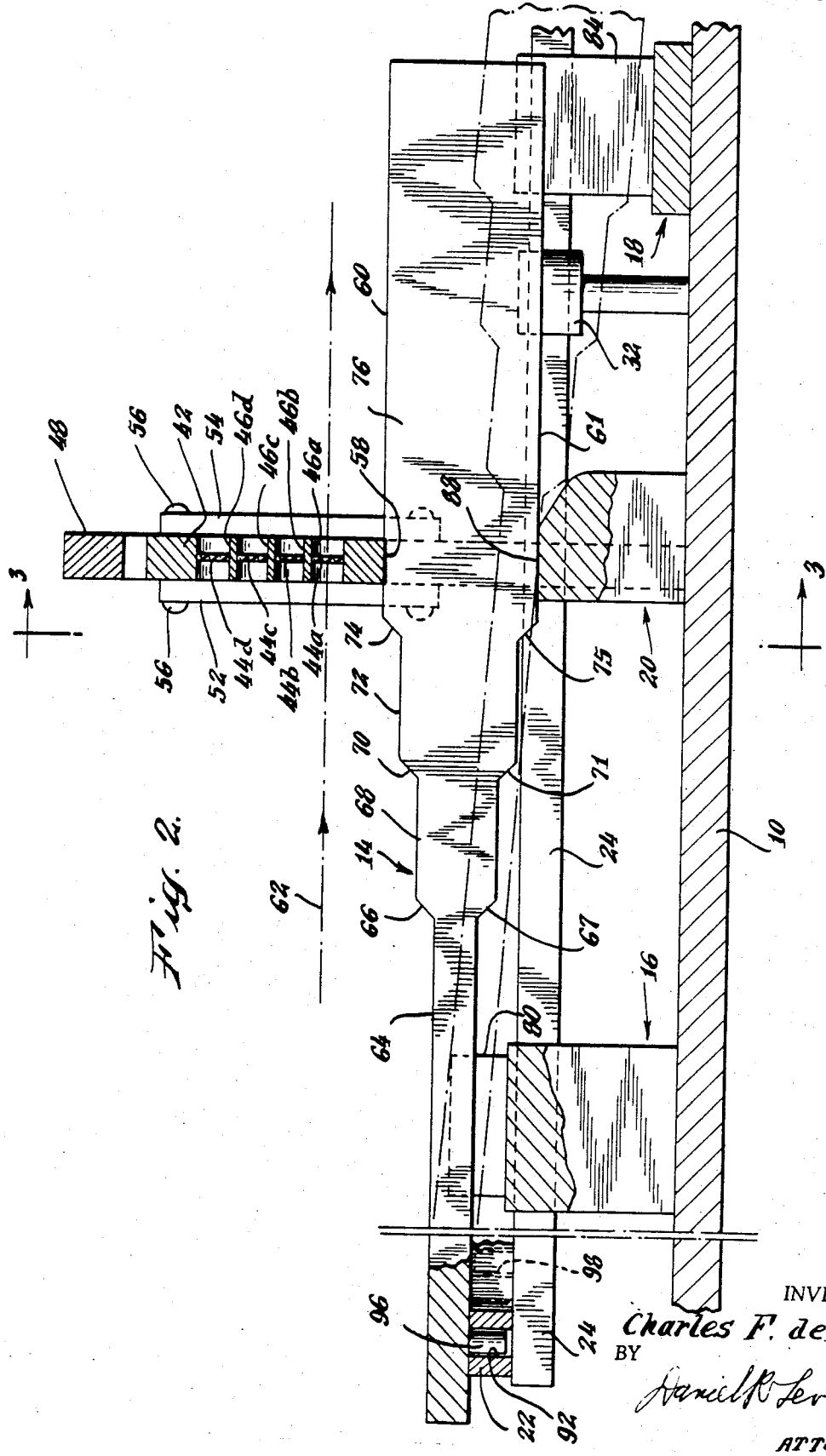

United States Patent Office 3,529,889
Patented Sept. 22, 1970

3,529,889
OPTICAL FILTER CHANGING MECHANISM
Charles Frederic de Mey II, West Redding, Conn., assignor to The Perkin-Elmer Corporation, Norwalk, Conn., a corporation of New York
Filed Feb. 12, 1968, Ser. No. 704,876
Int. Cl. G02b 5/22
U.S. Cl. 350—315       4 Claims

ABSTRACT OF THE DISCLOSURE

An optical filter changing assembly includes a linear array of different filters in a slide support and a two-sided cam lever. One cam surface of the lever rides on a fixed guide, while the opposite camming surface moves the filter holder. In this manner the filters may be moved using relatively gentle cam surfaces, since the filter motion is the sum of the contour changes of the two opposite cam surfaces of the lever. The lever may be moved generally linearly by any convenient arrangement, including conjointly with other adjustable parts of an optical instrument (for example, the wavelength drive rotating the diffraction grating of a filter-grating monochromator).

---

This invention relates to a mechanism for sequentially presenting each of a series of optical filters to a particular location (i.e., into a radiant energy beam). More particularly this invention concerns a mechanism in which the filter-moving element is a cam; the invention is characterized by the utilization of a two-sided cam lever for this purpose.

In various optical instruments, including for example monochromators of the filter-grating type which may be utilized for example in spectrophotometers, it is desired to move each of a series of optical filters into the radiation beam path according to a particular predetermined operation program. For example, in a filter-grating monochromator a series of different filters are introduced into the radiation beam during different portions of the complete wavelength scan (provided by continuously changing the angle between the diffraction grating and the radiation beam). In particular, a series of filters are utilized in this combination to limit the radiation wavelength bandwidth which is diffracted by and/or collected from the grating, so as to eliminate undesired radiation (which would be diffracted in the same direction as the desired collected radiation because the grating has different diffraction "orders," as is well known). For this and similar purposes it is desirable to step the various filters into the radiation path at appropriate times of the grating-angle cycle, by a moving means interconnected with the mechanism for changing the grating angle. One type of mechanism suitable for moving filters is a cam (of the generally step type).

The present invention utilizes a relatively simple and inexpensive lever having a generally linear cam surface and simple rectilinear motion. Additionally, the invention is characterized by providing a cam surface on each of two generally opposite sides of the cam lever, one of which rides on a fixed guide and the other of which moves the filters. In this manner the severity (i.e., the suddenness and prominence) of the cam contours may be minimized since the motion imparted to the filter sub-subassembly will be the sum of the changes of the two cam surfaces.

An object of the invention is the provision of an improved mechanism for sequentially positioning a series of filters into a radiation beam in a mechanically efficient manner.

Another similar object of the invention is the provision of such a mechanism that is relatively simple and inexpensive to manufacture but is nevertheless substantially free of any tendency to jam or otherwise malfunction in use.

A more specific object of the invention is the provision of such a mechanism in which a filter assembly is moved by a cam member having a pair of contoured surfaces, and being movably positioned between a fixed guide and the filter assembly, so as to cause the filter assembly to move by the sum of the changes in the contours of both cam surfaces.

Other objects features and advantages of the invention will become obvious to one skilled in the art upon reading the following specification in conjunction with accompanying drawings in which:

FIG. 2 is a side elevation and partial vertical section of the filter assembly and the cam member, taken on the line II—II in FIG. 1.

GENERAL DESCRIPTION

For purposes of illustration, it will be assumed that the filter changing mechanism of the present invention forms part of a filter-grating monochromator, although it is deemed obvious that the filter changing mechanism may be utilized in many other types of optical instruments. In a filter-grating monochromator, the diffraction grating (typically of the reflective type) is angularly rotated about an axis parallel to the grating "lines" relative to the incident radiant energy beam which is desired to be dispersed into its component parts according to wavelength (or frequency). As is well understood, diffraction gratings exhibit different "orders" (causing them to act like gratings having line spacing of integral multiples of their actual line spacing). In order to eliminate from the particular order used (typically the first order) the undesired radiation diffracted at a similar angle in a different order (and therefore of a different wavelength or frequency), such diffraction monochromators include a second optical means for separating the radiation according to wavelength (typically either a dispersing prism or at least one and more typically a series of optical filters). Where the diffraction grating is scanned (i.e., rotated) over a relatively large wavelength range, a pluraliy of different optical filters will be necessary, each passing the desired wavelength range (corresponding to the wavelength neighborhood for which the grating is set at that particular time) while excluding wavelengths outside of this neighborhood. Thus, in a scanning monochromator of the diffraction grating type, a series of optical filters will normally be necessary, so that some mechanism for interchanging one filter for another at appropriate parts of the wavelength scanning (i.e., at the particular angular positions of the grating) is required, if the instrument is to be fully automated. Accordingly, the exemplary embodiment of the invention may be considered as being used for this purpose, although it is clearly not limited to such use.

Figure 1:
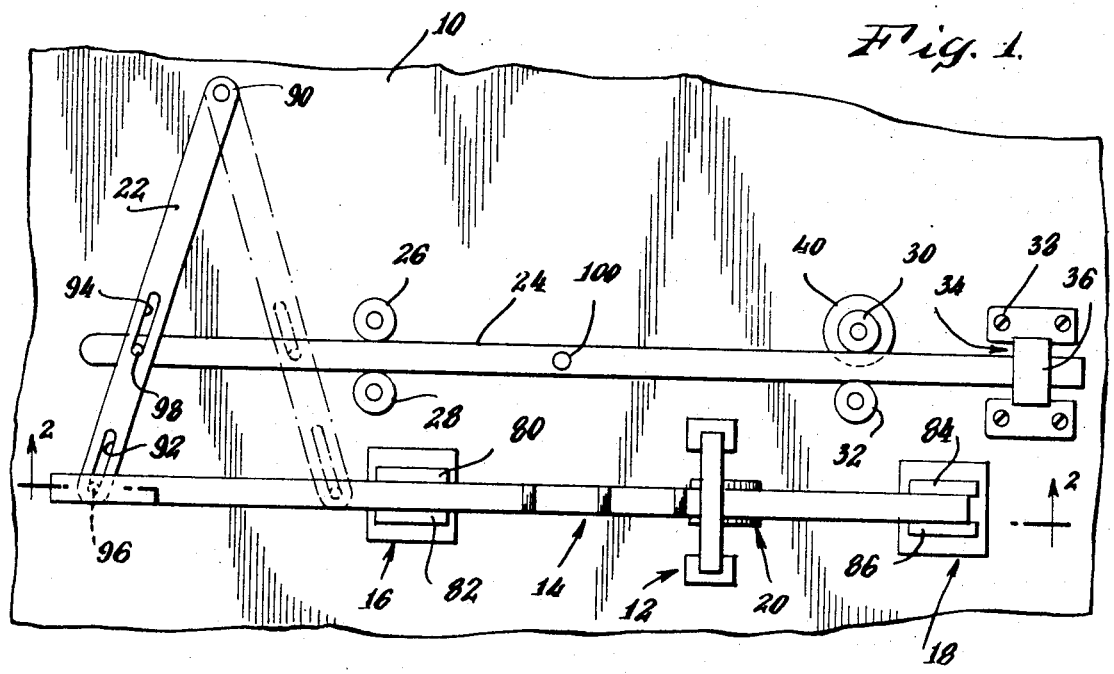
FIG. 1 is a plan view of an exemplary preferred embodiment of a filter changing mechanism according to the invention.

In FIG. 1 reference numeral 10 designates a part of the main mechanism or support plate of the instrument (e.g., an absorption spectrophotometer) in which the exemplary filter changing mechanism of the invention is used. Such a mechanism may comprise generally a filter holder assembly 12, a cam member 14 for moving the filter holder assembly 12, a pair of guides 16, 18 for the cam member, and a fixed guide or fulcrum 20. Means for longitudinally moving (i.e., horizontally in FIG. 1) the cam member 14 may comprise a pivoting linking lever 22 connected by a pin and slot connection both to the left-hand end of cam member 14 and to a driving bar 24, which is restrained to solely longitudinal movement (i.e., horizontal in FIG. 1). Exemplary means for this purpose may include a left-hand pair of idler rollers 26, 28; an intermediate pair of rollers 30, 32; and a guiding socket 34 having an appropriately shaped bushing for receiving bar 24 as indicated at 36, and attached to the main plate 10 as by screws 38. One of the, say, intermediate rollers (for example 30) is driven, for example, directly by a motor 40 as indicated in FIG. 1.

DETAILED DESCRIPTION

Figure 3:
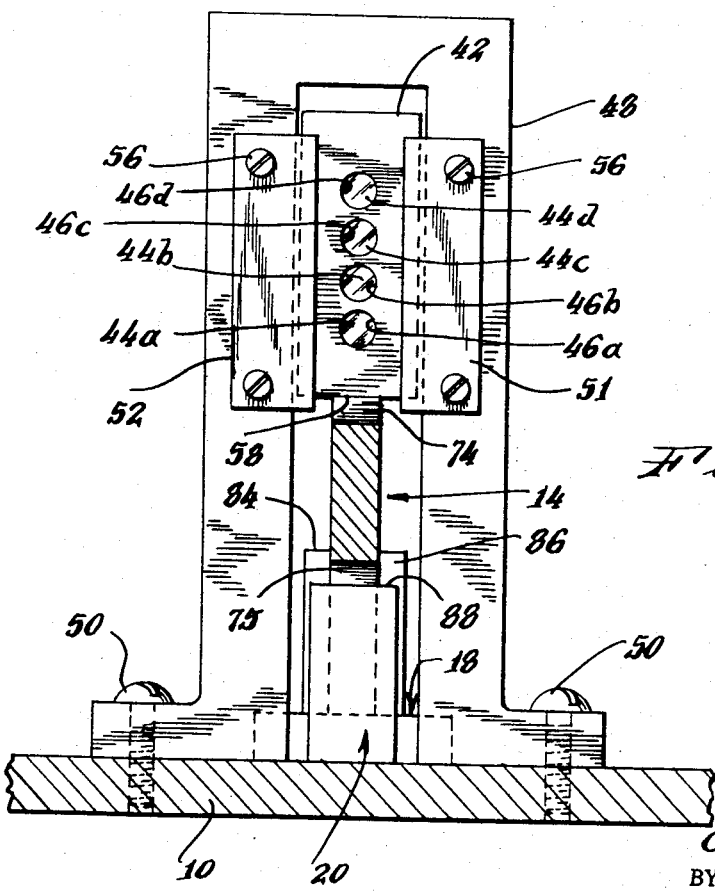
FIG. 3 is a front elevation and partial vertical section through the cam member, showing the front of the filter assembly, taken on the line III—III in FIG. 2.

The details of the filter assembly 12 are best seen in FIGS. 2 and 3. This assembly may include a slideable filter holder 42 carrying a series of different optical filters 44a, 44b, 44c, and 44d in any convenient manner in a series of corresponding apertures 46a–46b. The filter holder 42 may slide as a unit in the vertical direction but is restrained from other motions, as by a generally inverted U-shaped bracket 48, attached as by screws 50 to the main plate 10. Both the front (i.e., see FIG. 3) and the back of bracket 48 have attached a pair of plates (of which the front pair 51 and 52 are visible in FIG. 3, and one of each of the front and rear pairs are visible in FIG. 2 at 52 and 54). Each of these plates 51–54 is secured (as by screws 56) to the respective front or back surface of bracket 48 so as to partially overlie the adjacent respective surface of the filter holder 42 (see FIG. 2); thereby forming parallel guides or tracks for the filter holder. The bottom of the filter holder 42 at 58 rides on the upper surface 60 of the cam member 14, so that the height of the filter holder 42 is determined by the height of upper surface 60. In this manner each one of the various filters 44a–44b may be selectively positioned so as to intercept a radiant energy beam, schematically shown at 62.

Cam lever 14 comprises in the exemplary embodiment a relatively long narrow lever of variable height (i.e., as seen in FIG. 2). In particularly it may comprises a long left hand end 64 having a height comparable to its relatively narrow thickness (i.e., the horizontal dimension as seen in FIG. 3). The left-hand end portion 64 widens as at 66 to form a first somewhat "higher" portion 68, which in turn widens at 70 to form a still higher portion 72; finally at 74 cam lever 14 widens again so as to form the full height right-hand portion 76. It should be noted that the cam lever 14 in FIG. 2 widens substantially symmetrically about its centrol line so that each of the generally oblique width-increasing cam contours or parts 66, 70 and 74 on the top of the lever have corresponding width-increasing cam contour surfaces 67, 71 and 75 on the bottom surface 61 of the lever. Where, as in the illustrated embodiment, the fulcrum surface 88 (of guide 20) is directly below the filter holder 42, the various pairs of width-increasing cam contours (i.e., 66, 67; 70, 71; and 74, 75) should be directly aligned also. If the fulcrum and filter holder are somewhat offset longitudinally along the cam member 14 (i.e., horizontally in FIG. 2), these top and bottom width-increasing contours of parts would be similarly offset, so that both members or a pair become operative at substantially the same time.

A left-hand guide 16 (compare FIGS. 1 and 2), laterally constrains the relatively thin left-hand portion 64 of the lever and is of substantially greater height than the right-hand bottom guide 18, which laterally constrains the full height right-hand portion 76 of the lever. Each of these lateral guides (16, 18) may include means such as at 80, 82 and 84, 86 respectively, for restraining cam lever 14 to movement solely laterally (in FIGS. 1 and 2 (i.e., perpendicular to the plane of the paper in FIG. 3). Intermediate fixed guide 20 has an upper fulcrum surface at 88 substantially directly under the bottom surface 58 of filter holder 42. Thus, the width of the particular portion of lever 14 between its upper and lower surfaces (60 and 61 respectively) determine the distance between the bottom surface 58 of filter holder 42 and the fixed upper surface 88 of guide 20, thereby determining which of the various filters 44a–44d is positioned in the radiation beam (62). Thus, movement of the cam lever 14 from the position shown in FIG. 2 to the right so as to cause the next (narrower) portion 72 to be positioned between fixed guide 20 and the filter holder 42, will move a different filter (in this case 44b) into the radiation beam 62. It should be noted that cam lever 14 will itself move down a distance equal to the vertical height of the bottom cam contour portion 75 (with filter holder 42 of course thereby being lowered this amount), and in addition the filter holder 42 will move relative to the center of cam lever 14 by an additional amount equal to the (same) height of upper cam contour portion 74. Thus, the filter holder 42 and the filters therein will move a distance equal to the sum of the cam contour changes (e.g., 74 and 75). This allows the actual movement of filter holder 42 (and its filters) to be made more rapidly without risking binding of the cam contour surfaces (i.e., 66, 70 and 74) during either operation of reset of the cam lever 14 than would be possible if a single contour surface of the cam (necessarily of double the height changes) were utilized.

The exemplary means for reciprocating the cam lever 14 to the left and right (in FIGS. 1 and 2) comprises a lever 22 pivotally mounted about a fixed pin 90 and having a pair of elongated slots 92, 94. The slot 92 most remote from the fixed pivot pin 90 is engaged by a pin 96 rigidly depending from the bottom surface of the left-hand portion 64 of lever 14; and intermediate slot 94 is engaged by a similar pin 98 rigidly attached to the upper surface of driving bar 24. The pen and slot connection at 92, 96 should provide for some tilting of lever 14 during operation (the end position of the lever being shown in dotted lines in FIG. 2). Driving bar 24 is laterally guided by two pairs of rollers 26, 28 and 30, 32 as well as the substantially surrounding socket guide 34. The driving bar may in turn be driven by supplying rotative motion to one of the rollers, for example, 30, by any convenient means, such as motor 40. The same driving bar may be utilized to move any other elements of the optical instrument. For example, a pin 100 on the driving bar 24 may be utilized to move a linkage mechanism causing the diffraction grating of the monochromator to be moved in a programmed manner, for example, by the cosecant lever system disclosed in applicant's copending application Ser. No. 679,011 filed on Oct. 30, 1967, and entitled Variable Rate Angular Drive Mechanism. In this manner the driving bar will cause the cam lever 14 to constantly move and therefore synchronously change the filters according to a predetermined program, which may be readily synchronized with another function (e.g., rotation of the diffraction grating) of the optical instrument by the use of a common driving bar 24.

OPERATION

The manner in which the entire filter changing mechanism operates has been fairly completely described in the detailed description immediately hereinabove; the manner of operation will be briefly summarized. Rotation of the drive roller 30 by motor 40 will cause the driving bar 20 to be moved in a linear (horizontal in FIG. 1) direction so as to pivot linking lever 22 about its fixed pivot 90 and thereby move cam lever 14 in a directly proportional manner. In theory, drive bar 24 can be driven by the motor 40 in either direction during the operation of the instrument and then returned to its original position by (preferably a relatively rapid) opposite motion (e.g., by reversing motor 40). Preferably however, the operating motion of the cam lever will be to the right in FIGS. 1 and 2, and the resetting motion will be to the left. As long as a constant height portion (i.e., 64, 68, 72 or 76) is between the upper or fulcrum surface 88 of fixed guide 20 and the bottom 58 of the filter holder 42, one of the filters (44a–44d) will be maintained in path of the radiation beam 62. As the cam lever 14 moves (say, to the right), each of the height-changing cam contour portions (66, 70 and 72 on the upper surface and 67, 71 and 75 on the bottom surface of cam lever 14) will in turn reach the position between the bottom surface 58 of filter holder 42 and the upper surface 88 of fixed guide 20, causing the filter holder to move vertically (in this case downward under gravity) a distance equal to the total change in height of the cam lever at each such height changing contour. Thus, each filter will be maintained in the radiation beam for a certain time, and then the next successive filter will be sequentially moved in to the radiant energy beam. The relative length of the constant height portions of cam lever 14 (i.e., the distance between the contour change portion 66, 70 and 74) will determined the length of time each filter remains in the beam. By using height-changing cam contours not only on the upper surface (i.e., at 66, 70 and 74) but also at corresponding points of a lower surface (i.e., 67, 71 and 75), twice as much motion of the filter holder can be obtained for a particular slope of the change of height portions during the same longitudinal (i.e., right to left in FIGS. 1 and 2) movement of the cam lever 14. Since in this type of mechanism, the cam lever is reset to its initial position by moving it longitudinally back to its original position, it should be noted that regardless of the direction in which the cam contour changes during operation, the mechanism will have a lessened tendency to jam during that one of these motions in which the filter holder 42 is lifted. Thus, it is not material to the concept of the invention as to whether the tendency to bind occurs during normal operation or the resetting operation, since in any case the tendency will be minimized.

CONCLUSION

Thus, the invention provides an improved mechanism for changing a series of filters, which mechanism has a substantially reduced tendency to jam for a particular maximum rate of change (i.e., rate of movement of the filter holder 42 during changes of one filter for another). Despite this improved performance, the entire mechanism is relatively inexpensive and simple to manufacture, involving very few moving parts and even fewer requiring any substantial degree of precision in manufacture. Since it is essentially the height (as seen in FIG. 2) of the cam lever 14 and the particular position of the upper surface 88 of the guide 20 that determines the various positions of the filter holder 42, only the contour of the cam lever 14 and the height (or vertical position) of the guide 20 need be precise. Guide 20 may be made adjustable in height in any conventional manner so as to allow greater tolerance in the overall width of the cam lever, or to compensate for wear on the surfaces. In general, however, the cam lever can be made by any inexpensive manufacturing technique (i.e., casting, molding, or the like) of any suitable material (metal, epoxy resin, or any hard so called "plastic," i.e., artificial resin) to an acceptable tolerance. In fact all of the parts involved determining the vertical height of the particular filter in the beam 62 (i.e., parts 42, 48, 20 and 14) may be made by conventional mass production techniques, while obviating any need for adjustment both on assembly and normal use. Thus, the filter changer mechanism of the invention may be constructed quite inexpensively and still offer a substantial improvement in its ability to rapidly change the filter by moving the filter holder 42, without any undue likelihood of the assembly jamming (during either direction of linear movement of the cam lever 14).

Although the invention is described in a preferred specific exemplary embodiment and it has been indicated how it may be incorporated in an exemplary specific type of optical instrument (namely, a filter-grating type of monochromator), many changes in detail and various uses will be obvious to one skilled in the art. Accordingly, the invention is not limited to any of the specific details of the illustrative embodiment, nor to use in any specific type of optical instrument. Rather the invention is defined solely by the scope of the appended claims.

What is claimed is:

1. A filter changing mechanism for an optical instrument comprising:
   a filter holder containing a series of optical filters:
   means for movably supporting said holder;
   a fixed guide means;
   a cam member having a first contoured surface engaging said fixed guide, and a second contoured camming surface operatively engaging said filter holder so as to control the position of said holder in said supporting means, each of said surfaces being discontinuous and stepped; and
   means for moving said cam member;
   whereby said first contoured surface causes positioned changes of said cam member, and said second camming surface moves said filter holder in a stepwise manner to a series of discrete particular positions to introduce desired ones of said filters sequentially into said radiant energy beam;
   said particular positions of said filter holder being thereby determined by the combined configuration of said first and second contoured surfaces, so as to reduce the otherwise required contour changes of said second camming surface.

2. A filter changing mechanism according to claim 1, in which:
   said filter holder comprises means for holding said series of optical filters in a substantially linear array;
   and said means for movably supporting said holder comprises track means for slidably supporting said filter holder along a substantially straight line path;
   whereby said filter holder is moved from one particular position to another along a generally linear path to introduce the desired one of said filters into the radiant energy beam.

3. A filter changing mechanism according to claim 2, in which:
   said cam member is an elongated cam lever having a pair of opposite longitudinal stepped edges defining a series of different constant-width portions, each connected by one of a plurality of width-changing parts;
   and said first and second surfaces of said cam member comprise said opposite longitudinal edges of said cam lever;
   whereby said particular linear positions of said filter holder are determined by the width of said cam lever between said opposite longitudinal edges.

4. A filter changing mechanism according to claim 3, in which:
   said cam lever is substantially symmetrical about its longitudinal center-line;
   whereby each of said opposite longitudinal stepped edges contributes at said width-changing parts substantially one-half of the desired change in position of said filter holder, thereby minimizing any tendency of said cam lever to bind when moved so as to cause wider portion to be moved into filter holder engagement.

References Cited

UNITED STATES PATENTS

| | | | |
|---|---|---|---|
| 2,146,634 | 2/1939 | Leonard | 350—315 X |
| 2,481,648 | 9/1949 | Dehn | 74—110 X |

DAVID SCHONBERG, Primary Examiner

T. H. KUSER, Assistant Examiner

U.S. Cl. X.R.

74—110; 350—318; 355—71